US012275528B2

(12) United States Patent
Cluer et al.

(10) Patent No.: US 12,275,528 B2
(45) Date of Patent: Apr. 15, 2025

(54) COVER OR HARNESS FOR AN AIRCRAFT PASSENGER

(71) Applicant: Safran Seats GB Limited, Cwmbran (GB)

(72) Inventors: Kevin Cluer, Cwmbran (GB); Ciaran Doherty, Cwmbran (GB); Joanna Hutchinson, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 564 days.

(21) Appl. No.: 17/413,056

(22) PCT Filed: Dec. 11, 2019

(86) PCT No.: PCT/GB2019/053495
§ 371 (c)(1),
(2) Date: Jun. 11, 2021

(87) PCT Pub. No.: WO2020/120952
PCT Pub. Date: Jun. 18, 2020

(65) Prior Publication Data
US 2022/0009640 A1 Jan. 13, 2022

(30) Foreign Application Priority Data
Dec. 12, 2018 (GB) ..................................... 1820254

(51) Int. Cl.
*B64D 11/06* (2006.01)
(52) U.S. Cl.
CPC ...... *B64D 11/06205* (2014.12); *B64D 11/062* (2014.12); *B64D 11/0641* (2014.12)
(58) Field of Classification Search
CPC ............ B64D 11/06025; B64D 11/062; B64D 11/0641
See application file for complete search history.

(56) References Cited

U.S. PATENT DOCUMENTS 4,927,211 A * 5/1990 Bolcerek .............. A47D 15/006
297/484
5,063,879 A 11/1991 Vorbau
(Continued)

FOREIGN PATENT DOCUMENTS

DE  102005014997 A1  10/2006
DE  102014213301 A1   1/2016
(Continued)

OTHER PUBLICATIONS

International Patent Application No. PCT/GB2019/053495, International Search Report and Written Opinion, dated Mar. 17, 2020.
(Continued)

*Primary Examiner* — Philip F Gabler
(74) *Attorney, Agent, or Firm* — Kilpatrick Townsend & Stockton LLP

(57) ABSTRACT

The invention provides a cover for an aircraft passenger using a bed surface of an aircraft passenger seat, comprising an attachment mechanism for attaching the cover to the seat, an inflatable bladder, and a trigger mechanism for triggering inflation of the bladder, the bladder being configured to cover a knee region of the bed surface. The invention also provides a harness for the aircraft passenger, comprising an attachment mechanism for attaching the harness to the seat, a number of straps for extending around the passenger, and a fastening mechanism for fastening one or more of the straps in place around the passenger, wherein the number of straps includes at least one of a crotch strap and a torso strap. The invention also provides an aircraft passenger seat unit comprising a seat convertible to a bed, the bed being provided with a cover or harness.

18 Claims, 5 Drawing Sheets

(56) References Cited

U.S. PATENT DOCUMENTS

| | | | |
|---|---|---|---|
| 5,074,588 A | 12/1991 | Huspen | |
| 5,540,403 A | 7/1996 | Standley | |
| 5,876,059 A | 3/1999 | Kleinberg | |
| 6,467,851 B1 | 10/2002 | Mannell et al. | |
| 7,131,703 B1 * | 11/2006 | Sheridan | B60R 22/14 297/485 |
| 8,007,046 B2 * | 8/2011 | Rothschild | B64D 11/06 297/485 |
| 8,491,058 B2 * | 7/2013 | Siegel | B60R 22/14 297/465 |
| 2015/0130244 A1 * | 5/2015 | Wyss | B64D 11/0604 297/354.13 |
| 2016/0244173 A1 * | 8/2016 | Deevey | B64D 11/06205 |
| 2016/0318612 A1 | 11/2016 | Deevey et al. | |
| 2017/0203848 A1 * | 7/2017 | Sirous | B64D 25/04 |
| 2017/0232929 A1 | 8/2017 | McGovern | |

FOREIGN PATENT DOCUMENTS

| | | |
|---|---|---|
| WO | 2018033599 A1 | 2/2018 |
| WO | 2018078377 A1 | 5/2018 |

OTHER PUBLICATIONS

United Kingdom Patent Application No. 1820254.9, Search Report, dated Aug. 8, 2019.
United Kingdom Patent Application No. 1820254.9, Search Report, dated Jun. 6, 2019.
Europe Patent Appl. No. 19823938.6, Communication pursuant to Article 94(3) EPC (Office Action), dated Dec. 20, 2023.

* cited by examiner

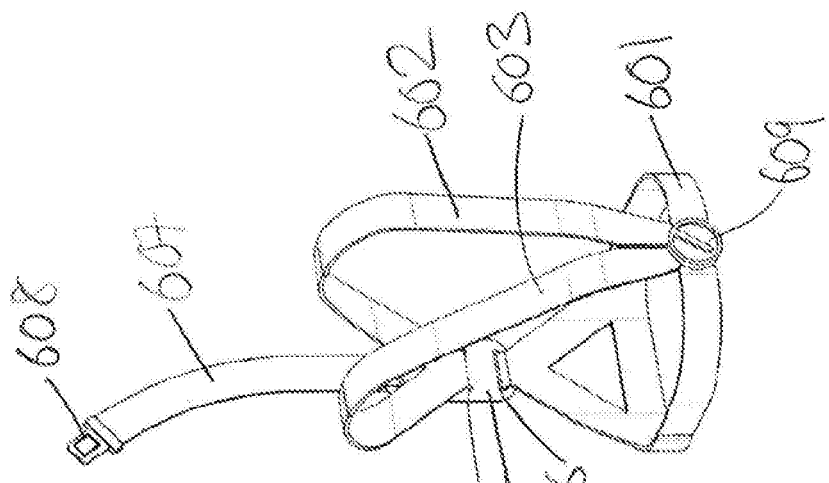
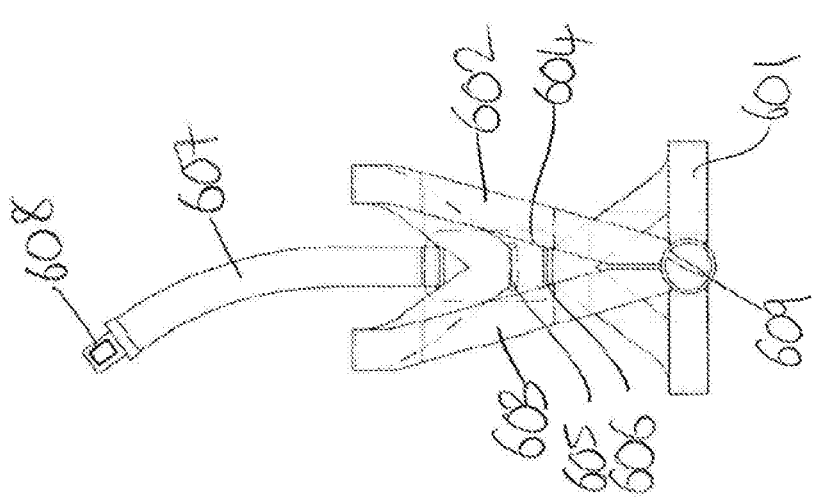
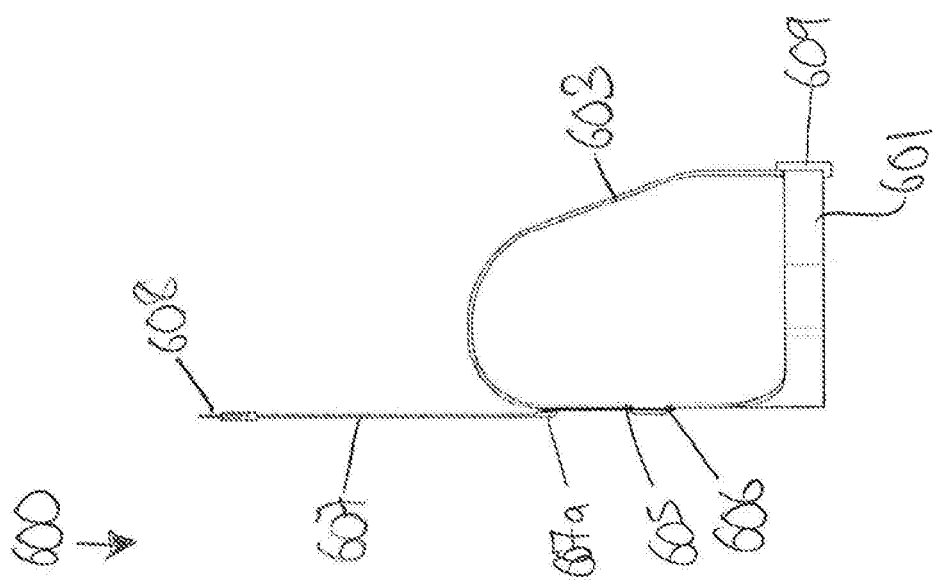

COVER OR HARNESS FOR AN AIRCRAFT PASSENGER

CROSS-REFERENCE TO RELATED APPLICATIONS

This application is a national stage application of International Patent Application PCT/GB2019/053495, filed on Dec. 11, 2019 and titled "A Cover Or Harness For An Aircraft Passenger," which is related to and claims priority benefits from United Kingdom Patent Application No. 1820254.9, filed on Dec. 12, 2018 and titled "A Cover Or Harness For An Aircraft Passenger," both of which are hereby incorporated by reference in their entireties.

BACKGROUND OF THE INVENTION

The present disclosure relates to a cover for an aircraft passenger using a bed surface of an aircraft passenger seat. The present disclosure also relates to a harness for an aircraft passenger using a bed surface of an aircraft passenger seat.

The present invention concerns aircraft passenger seating. More particularly, but not exclusively, this invention concerns covers and harnesses for aircraft passengers using a bed surface of an aircraft passenger seat. More particularly, such covers and harnesses comprise an attachment mechanism for attaching the cover or harness to the seat. The invention also concerns an aircraft passenger seat unit comprising a seat convertible to a bed, the seat being provided with such a cover or harness.

One of the major concerns with aircraft seating is to provide a comfortable experience as possible, especially for first class or business class passengers. In those classes, it is usual to provide a seat that is convertible from a seat configuration to a lie flat bed configuration.

Various regulations apply during taxi, take-off and landing (TTL) that are designed to reduce injuries in the case of an emergency and to allow a swift evacuation of the aircraft cabin, should that be necessary. For example, the regulations require that injuries, and in particular head injuries, are avoided in a 16G crash test. The regulations also require there to be an evacuation within 90 seconds. During TTL, the seat is kept in its seat configuration to enable these regulations to be met. However, during cruise, the passenger can use the seat in the bed configuration.

A passenger may wish to try and get as much sleep as possible and so may wish to use the seat in its bed configuration during TTL. This may be especially true during relatively short flights (for example between 3 to 5 hours), where the boarding and TTL time is a significant proportion of the total time spent on the aircraft by the passenger. However, this is not possible because of the safety concerns and regulations mentioned above.

The present invention seeks to mitigate the above-mentioned problems. Alternatively or additionally, the present invention seeks to provide a way of enabling a passenger to use their seat in a bed configuration during TTL. Alternatively or additionally, the present invention seeks to provide a cover or harness for an aircraft passenger for use with an aircraft passenger seat.

SUMMARY OF THE INVENTION

The present invention provides, according to a first aspect, a cover for an aircraft passenger using a bed surface of an aircraft passenger seat, the cover comprising an attachment mechanism for attaching the cover to the aircraft passenger seat, an inflatable bladder, and a trigger mechanism for triggering inflation of the inflatable bladder, wherein the inflatable bladder is configured so as to cover at least a knee region of the bed surface.

The bed surface of the aircraft passenger seat has different regions according to which parts of a passenger's body occupy those regions when the passenger is lying on the bed surface. For example, a head region would be towards one end of the bed surface and is the region occupied by the passenger's head when lying on the bed surface (i.e. the seat in a bed configuration). This head region would at least approximately coincide with the region occupied by the passenger's head when seated in a seat configuration of the seat. For example, a waist region would be towards the middle of the bed surface and is the region occupied by the passenger's waist when lying on the bed surface (i.e. the seat in a bed configuration). This waist region would at least approximately coincide with the region occupied by the passenger's waist when seated in a seat configuration of the seat. For example, this may be where a waist seat belt is located. It may be where a backrest of the seat is pivotally mounted to a seat pan of the seat.

The knee region would be towards the middle of the bed surface, but towards an end (opposite from the head region) from the waist region. The knee region is the region occupied by the passenger's knees when lying on the bed surface (i.e. the seat in a bed configuration). The knee region may be an area across the whole of the width of the bed surface occupied by the passenger's knees when lying on the bed surface. This knee region would at least approximately coincide with the region occupied by the passenger's knees when seated in a seat configuration of the seat. The knee region would at least approximately coincide with area across the whole of the width of the seat surface occupied by the passenger's knees when seated in a seat configuration of the seat. For example, the knee region may correspond to the location where a leg rest portion of the seat is pivotally mounted to a seat pan of the seat. The aircraft seat may be convertible between a seat configuration and a bed configuration. In this way the regions of the bed surface, when in the bad configuration, will correspond to the same regions of the seat, when in the seat configuration. The inflatable bladder may be configured so as to cover at least a substantial proportion of the knee region of the bed surface. The inflatable bladder may be configured so as to cover at least the entire of the bed surface.

Providing an inflatable bladder that is configured so as to cover at least a knee region of the bed surface allows for the knees of a passenger of the seat to be restrained when the bladder is inflated, for example during an emergency. This means that it may be possible for the passenger to lie on the seat (in its bed configuration) for TTL. Having an inflatable bladder that is configured so as to cover at least a knee region of the bed surface may allow for the legs of the passenger of the seat to be effectively restrained. The cover may extend across, for example, at least 50%, at least 75% or 100%, of the width of the knee region. The cover may extend across a region of the bed surface occupied by both knees of a passenger when lying on the bed surface.

Importantly, having an inflatable bladder covering a region, provides a "pinning down" effect over the region when the bladder is inflated. If the passenger is lying down, the "pinning down" effect may prevent the passenger sliding forward (or backwards or sideways) over the bed surface and so prevent the passenger from hitting any rigid surface of the seat shell or seat console, for example. The cover may be attachable to the aircraft seat occupied by the passenger.

The cover may be arranged to cover a passenger in close proximity to the passenger when lying on the bed surface. Covering the passenger in close proximity may provide for improved pinning down of the passenger when the airbag is inflated.

The trigger mechanism may be designed for triggering inflation of the inflatable bladder upon detecting an impact, for example, an impact as a result of a sudden deceleration of the seat. This allows the inflatable bladder to take up a small amount of space when restraint (or "pinning down") is not required, whilst still providing suitable restraint (or "pinning down") when required.

The inflatable bladder is located with respect to the bed surface so as to cover a knee region of the bed surface.

The inflatable bladder may be located and/or sized so as to also cover at least part of a lower leg region (i.e. a region from the knee region to an foot region) of the bed surface. The inflatable bladder may be located and/or sized so as to also cover at least part of an upper leg region (i.e. a region from the knee region to a waist region) of the bed surface. The inflatable bladder may be located and/or sized so as to also cover at least part of a torso region (i.e. a region from a waist region to a chest region) or the waist region of the bed surface. The covering of any number of these additional regions may be provided with additional inflatable bladders, for example second and third inflatable bladders.

The inflatable bladder may be configured so as to cover at least a major proportion of the length (from a head region to a foot region) of the bed surface. The inflatable bladder may be configured so as to cover at least a major proportion of the bed surface (from a head region to a foot region).

Preferably, the cover is provided with a loop or sleeve for providing a seatbelt therethrough, such that the cover can be secured to the seat belt of the seat. This ensures that the cover is secured in place with respect to the seat. It also allows the regions of the cover (i.e. locations of the inflatable bladder(s)) to be correspond accurately to the regions of the bed surface. In other words, the waist region of the cover can be secured to the waist region of the bed surface. The loop or sleeve may be on an upper layer of the cover.

More preferably, the inflatable bladder is provided in a region approximately 40 to 50 cm, and more preferably around 45 cm, from the seatbelt loop or sleeve. Thus, the inflatable bladder is provided at a suitable location relative to a waist region.

Preferably, the cover comprises an upper layer and a lower layer, wherein the aircraft passenger can lie in between the two layers. This provides a sleeping bag level of comfort for the passenger and prevents draughts, for example. The upper layer may cover the passenger in close proximity to the passenger.

More preferably, the upper layer is provided with the inflatable bladder. The lower layer may be provided with the attachment mechanism. This allows the attachment mechanism to be secured to the seat, without causing inconvenience to the passenger using the seat. The attachment mechanism may comprise a number of straps for attaching the lower layer of the cover to the aircraft passenger seat.

The cover may be in the form of a bag provided by the upper and lower layers and an at least partially closed end. The closed end helps to prevent the passenger sliding out of that end of the bag, for example if experiencing a force acting in the direction of the closed end. The closed end may correspond to a foot region of the bed surface. The foot region may be at a forwards end of the bed surface with respect to the flight direction.

Preferably, the upper and lower layers are provided with a closure along at least one length edge, to allow the upper and lower layers to be closed together along that length edge. The closure may be a closure that can be opened and closed.

Preferably, in a region along the length edge, the upper and lower layers are not provided with a closure. In this region, the upper and lower layers may be open so that they are not closed together. This reduces the amount of closure that needs to be opened in order for a passenger to vacate the cover. This aids passenger egress.

More preferably, the region (not provided with a closure) along the length edge is towards one end of the length edge, and preferably below the knee region of the bed surface. A closure in this region would be harder for a passenger to open as it would be further away from their hands, especially when lying down inside the cover. Hence, not having a closure there is especially advantageous to aid egress. The region may be towards the closed end.

The closure may be opened by relative movement of the upper layer away from the lower layer. For example, the closure may comprises Velcro™, a zip or any other suitable fastener.

The cover may have a permanent connection along at least one length edge, preferably a different length edge than the one with the closure. For example, the permanent connection may be a fold where the upper layer is folded over the lower layer. At this fold, the upper and lower layers are permanently closed.

Preferably, the cover comprises a removable liner. This allows for the liner to be easily removed for washing (and reduce the amount of washing required for the part of the cover comprising the inflatable bladder). The liner could be attached to the cover by Velcro™ or a zip, for example. If the cover has upper and lower layers, it is especially advantageous for the removable liner to comprise an upper layer and a lower layer, wherein the aircraft passenger can lie in between the two liner layers (as well as the two cover layers). The liner may be in the form of a bag provided by the upper and lower layers and an at least partially closed end. The closed end may correspond to a closed end of the cover. The closed end may correspond to a foot region of the bed surface. The foot region may be at a forwards end of the bed surface with respect to the flight direction. Preferably, the upper and lower liner layers are provided with a closure along at least one length edge, to allow the upper and lower liner layers to be closed together along that length edge. Preferably, in a region along the length edge, the upper and lower liner layers are not provided with a closure. In this region, the upper and lower liner layers may be open so that they are not closed together. More preferably, the region (not provided with a closure) along the length edge is towards one end of the length edge, and preferably below the knee region of the bed surface. The closure may be opened by relative movement of the upper liner layer away from the lower liner layer. The cover may have a permanent connection along at least one length edge, preferably a different length edge than the one with the closure. For example, the permanent connection may be a fold where the upper liner layer is folded over the lower liner layer.

The inflatable bladder may be provided with a slow release valve to enable deflation. This would aid egress after a suitable amount of time had passed after inflation.

Preferably, the cover comprises a head protector configured so as to at least partially surround a head region of the bed surface, the head protector comprising an inflatable bladder. This provides protection for a passenger's head.

The inflatable bladder may be a second inflatable bladder, or may be the same inflatable bladder as before. There may also be provided a second mechanism for triggering inflation of the second inflatable bladder. Alternatively, the second inflatable bladder may be triggered by the same trigger mechanism as before.

According to a second aspect of the invention there is provided a harness for an aircraft passenger using a bed surface of an aircraft passenger seat, the harness comprising an attachment mechanism for attaching the harness to the aircraft passenger seat, a number of straps for extending around the passenger, and a fastening mechanism for fastening one or more of the straps in place around the passenger such that the passenger is secured in the straps of the harness, wherein the number of straps includes a crotch strap for extending in-between two legs of the passenger.

Providing a crotch strap for extending in between two legs of the passenger allows a passenger using the harness to be effectively secured to the seat. In particular, if the passenger experiences a force in the direction towards their feet (whilst lying down on the bed surface), the crotch strap will prevent them sliding towards their feet and potentially impacting any rigid surface of the seat shell or seat console, for example. This means that it may be possible for the passenger to lie on the seat (in its bed configuration) for TTL. The number of straps may prevent the passenger sliding forwards (or backwards or sideways) over the bed surface and so prevent the passenger from hitting any rigid surface of the seat shell or seat console, for example.

Preferably, the number of straps includes a waist strap for extending around a waist region of the passenger. This enables the crotch strap to be effectively held in place on the passenger. It also aids in the securing of the passenger to the seat.

Preferably, the crotch strap extends from a first location where it is attached to the waist strap, to a second location where it is attached to the waist strap.

The first location on the waist strap may be on an opposite side of the waist strap to the second location on the waist strap. This provides a secure arrangement of the harness.

According to a third aspect of the invention there is provided a harness for an aircraft passenger using a bed surface of an aircraft passenger seat, the harness comprising an attachment mechanism for attaching the harness to the aircraft passenger seat, a number of straps for extending around the passenger, and a fastening mechanism for fastening one or more of the straps in place around the passenger such that the passenger is secured in the straps of the harness, wherein the number of straps includes a torso strap for extending around a torso, below shoulders of the passenger.

The torso strap is for extending around the torso, for example extending around the chest (e.g. around the rib cage) or waist of a passenger.

Providing a torso strap for extending around a torso, below shoulders of the passenger, allows a passenger using the harness to be effectively secured to the seat. In particular, if the passenger experiences a force in the direction towards their feet (whilst lying down on the bed surface), the torso strap will prevent them sliding towards their feet and potentially impacting any rigid surface of the seat shell or seat console, for example. This means that it may be possible for the passenger to lie on the seat (in its bed configuration) for TTL. The number of straps may prevent the passenger sliding forwards (or backwards or sideways) over the bed surface and so prevent the passenger from hitting any rigid surface of the seat shell or seat console, for example.

Preferably, the number of straps includes a shoulder strap for extending over a shoulder of the passenger. This enables the torso strap to be effectively held in place on the passenger. It also aids in the securing of the passenger to the seat.

More preferably, the shoulder strap extends from a first location where it is attached to the torso strap, to a second location where it is attached to the torso strap.

The first location on the torso strap may be on an opposite side of the torso strap to the second location on the torso strap. This provides a secure arrangement of the harness.

Preferably, the fastening mechanism of the harness according to the second or third aspects of the invention, also fastens the one or more straps to at least one other strap.

The fastening mechanism of the harness according to the second or third aspects of the invention, may comprise a number of individual fastening connectors and wherein the one or more straps is provided with a corresponding fastening connector for fastening with one of the individual fastening connectors of the fastening mechanism.

The fastening mechanism may comprise a central fastening connector that connects with a number of other fastening connectors. The central fastening connector may comprise a quick release arrangement whereby the connection with all of the number of fastening connectors is released by the same release action.

The fastening mechanism may comprise a number of insertable buckles, one for each of the other fastening connectors, for attachment within a corresponding buckle holder of the central fastening connector.

The harness according to the second or third aspects of the invention, may comprise a body portion, wherein the body portion is attached to at least two straps and retains the straps in relation to each other.

The body portion may be integral with a number of the straps such that it provides part of a length of the strap for extending around the passenger.

The harness may comprise a tether attached at one end to the body portion of the harness and attached at an opposite end to the attachment mechanism.

In the harness according to the second or third aspects of the invention, a number of the straps may comprise a spooling mechanism to spool in any excess length of the strap.

In the cover according to the first aspect of the invention, or the harness according to the second or third aspects of the invention, the attachment mechanism may comprise an insertable buckle for attachment within a corresponding buckle holder of the seat.

In the cover according to the first aspect of the invention, or the harness according to the second or third aspects of the invention, the attachment mechanism may comprise a buckle holder for attachment of a corresponding insertable buckle of the seat.

In the cover according to the first aspect of the invention, or the harness according to the second or third aspects of the invention, the insertable buckle and corresponding buckle holder provides a quick release arrangement.

According to a fourth aspect of the invention there is provided an aircraft passenger seat unit comprising a seat convertible to a bed, the seat unit being provided with a cover or harness as described above.

It will of course be appreciated that features described in relation to one aspect of the present invention may be incorporated into other aspects of the present invention. For example, the cover or harness of one aspect may incorporate any of the features described with reference to the harness or cover of another aspect and vice versa.

DESCRIPTION OF THE DRAWINGS

Embodiments of the present invention will now be described by way of example only with reference to the accompanying schematic drawings of which:

FIG. 8 shows a side view of a harness, according to a fourth embodiment of the invention;

FIG. 9 shows a front view of the harness of FIG. 8; and

FIG. 10 shows a perspective view of the harness of FIGS. 8 and 9.

DETAILED DESCRIPTION

Figure 1:
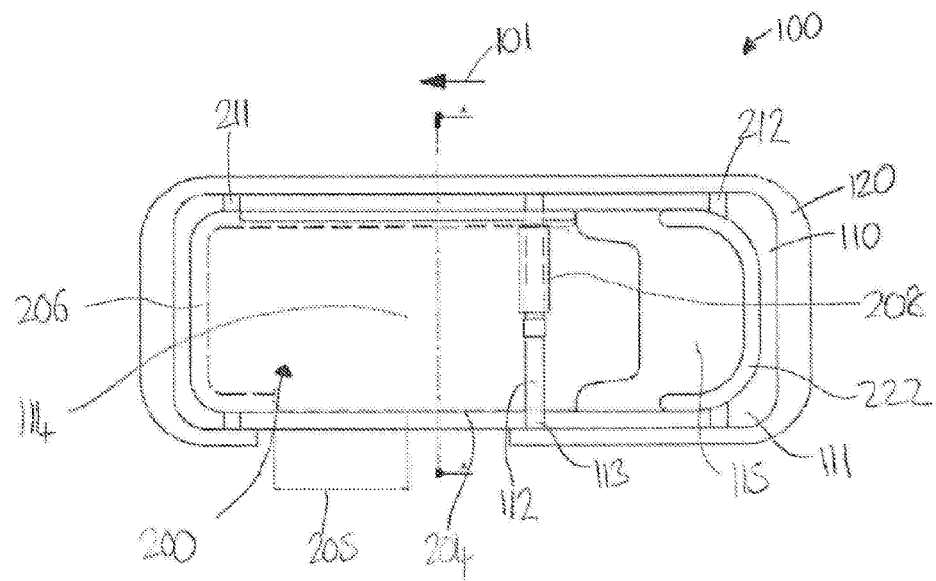
FIG. 1 shows a plan view of a cover, according to a first embodiment of the invention, being used on a bed surface of an aircraft passenger seat.

FIG. 1 shows a plan view of a cover 200, according to a first embodiment of the invention, being used on a bed surface 111 of an aircraft passenger seat 110.

The aircraft passenger seat 110 is part of an aircraft seat unit 100 that also comprises a surrounding seat shell 120. It can be seen that the shell 120 has an opening (towards the bottom of FIG. 1) to allow passenger egress to and from the seat 110. The seat 110 is a convertible seat, meaning that it is convertible between a seat configuration, in which a passenger can sit upright or reclined in the seat, and a bed configuration, in which the passenger can lie in a flat, or a substantially flat, position on the bed surface 111. The bed surface 111 is substantially horizontal.

The seat unit 100 is located in an aircraft cabin and arrow 101 indicates the flight direction of the aircraft. As can be seen, the seat unit 100 is positioned so that the seat 110 is substantially parallel to the flight direction 101.

The seat 110 is configured in FIG. 1 in its bed configuration. The bed surface 111 can be considered to have different regions:

- a head region 115, where a passenger's head would lie when laying on the bed surface,
- a shoulder region, where a passenger's shoulders would lie when laying on the bed surface,
- a torso region, where a passenger's torso would lie when laying on the bed surface,
- a waist region, where a passenger's waist would lie when laying on the bed surface,
- an upper leg region, where upper legs of the passenger (above the knee) would lie when laying on the bed surface,
- a knee region 114, where a passenger's knees would lie when laying on the bed surface,
- a lower leg region, where lower legs of the passenger (below the knee) would lie when laying on the bed surface, and
- a foot region, where feet of the passenger would lie when laying on the bed surface.

Not all of these regions are labelled in FIG. 1, but of course a skilled person would know by simply looking at the bed surface and knowing its orientation (i.e. which is a head end, and which is a foot end) where each region lies. In FIG. 1, the foot end is in the flight direction 101.

The seat is provided with a seat belt 112 located at the waist region of the bed surface 111. The seat belt 112 is provided with a spool mechanism (located at 113) to automatically retract the seat belt to a suitable length, to allow for different size passengers and providing a suitable tightness of belt for each one and to retract the seat belt when not in use (thus making egress in and out of the seat/bed easier).

Figure 2A:
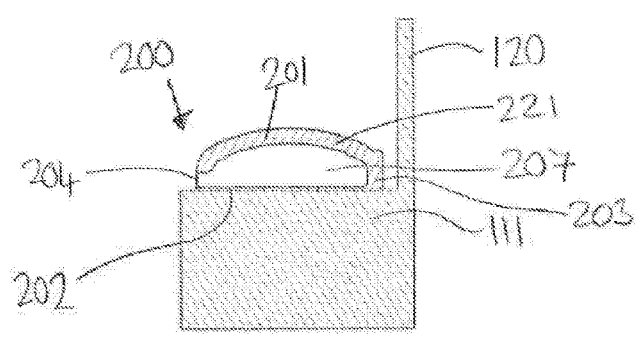
FIG. 2a shows a cross-sectional view of the cover of FIG. 1, along line A-A of FIG. 1, in an inflated configuration.
Figure 2B:
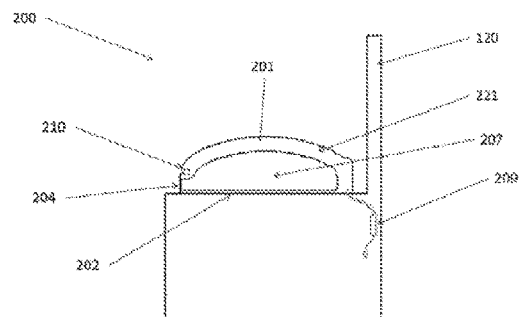
FIG. 2b shows a similar cross-sectional view of the cover of FIG. 1, in an inflated configuration, showing a trigger and inflation mechanism and a slow-release valve.

The cover 200 lies on top of the bed surface 111. FIGS. 2a and 2b show cross-sectional views of the cover 200 of FIG. 1, in an inflated configuration. Here, it can be seen that the cover 200 comprises an upper layer 201 and a lower layer 202. A passenger (not shown) using the cover 200 lies inside the cover in space 207 in between the two layers 201, 202.

The lower layer 202 lies flush on top of the bed surface 111 and is held in place by attachment straps to the bed surface 111. These attachment straps can be seen in FIG. 1; there is an upper attachment strap 212, located towards the head end of the bed surface 111 and a head end of the cover 200, and a lower attachment strap 211, located towards the foot end of the bed surface 111 and a foot end of the cover 200. These attachment straps 211, 212 are secured to the lower layer 202 and also to the bed surface 111 of the seat 110. Thus, the cover 200 is held in place on the bed surface 111.

The cover 200 is formed like a sleeping bag in that the upper layer 201 is folded over the lower layer 202 at fold 203, as shown in FIGS. 2a and 2b (located towards the top of FIG. 1). There is then a closed end 206, as shown in FIG. 1. Hence, the cover 200 forms a "sleeping bag". At the side of the "sleeping bag" that is towards the bottom of FIG. 1, and adjacent to the opening of the shell 120, is a closure 204 located along the upper leg and knee regions shown in FIG. 1. This closure 204 can be seen in FIGS. 2a and 2b. The closure is in the form of Velcro™ and joins the upper and lower layers 201, 202 together. The closure 204 can be opened by a passenger exerting a separation force between the upper and lower layers 201, 202.

As the closure only extends a certain length along the cover 200, there is an open region 205 located in the lower leg region of the bed surface 111. This open region allows for easier egress of the passenger (in comparison to having the closure running the entire length to the closed end 206 of the cover 200).

The upper layer 201 is provided with a loop 208, shown in FIG. 1. This loop 208 is designed to allow the seat belt 112 to pass through so that the cover 200 is naturally located in the right location with respect to the waist region of the bed surface 111.

The upper layer 201 is also provided with an inflatable bladder 221, shown in FIGS. 2a and 2b. The inflatable bladder 221 is connected to a trigger and inflation mechanism (209 in FIG. 2b) that automatically triggers quick inflation of the bladder in the event of a large force, for example, being experienced. Such trigger and inflation mechanisms are well known, for example, in the field of air bags.

Inflation of the bladder 221 causes the passenger in the space 207 to be effectively "pinned down" to the bed surface 111. This reduces the risk of injury. It may also enable the passenger to be in the lying down position, with the seat 110 in the bed configuration, for TTL.

The bladder 221 is located along the entire length of the upper layer 201, i.e. from a shoulder region to the foot region of the bed surface 111.

The inflatable bladder 221 is also provided with a slow release valve (210 in FIG. 2*b*) so that, once inflated, the bladder deflates slowly, to enable passenger egress after a suitable amount of time has passed after triggering.

It is also noted that the cover 200 comprises an inflatable head protector 222. This head protector surrounds the head region 115 of the bed surface to provide protection around the passenger's head. The head protector 222 comprises an inflatable bladder, which is a different inflatable bladder to the bladder 221. The head protector bladder is triggered by the same trigger mechanism 209 that triggers inflation of bladder 221.

Figure 3:
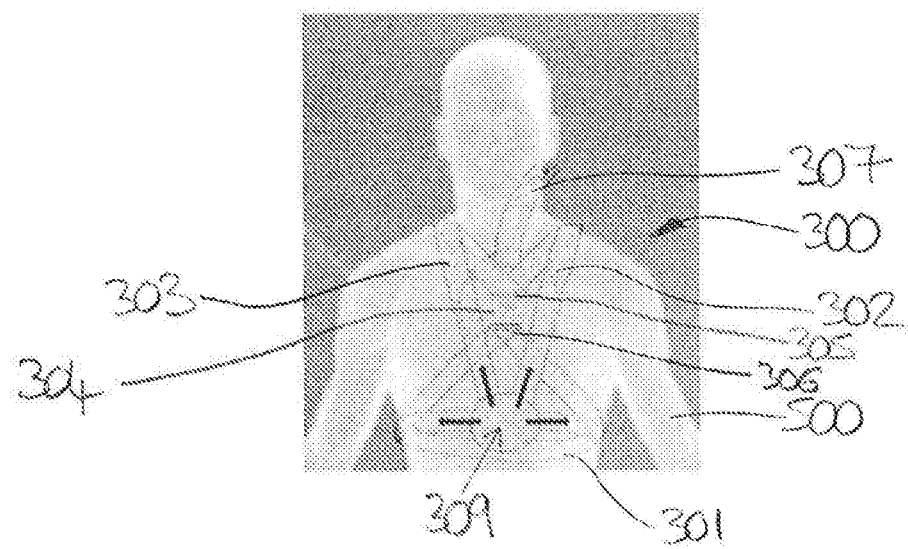
FIG. 3 shows a front view of a passenger wearing a harness, according to a second embodiment of the invention.

FIG. 3 shows a front view of a passenger 500 wearing a harness 300, according to a second embodiment of the invention.

The harness 300 comprises a torso strap 301 extending around the torso of the passenger 500, below their arms/shoulders. The harness also comprises a first shoulder strap 302 extending from a front central portion of the torso strap 301, over a left shoulder of the passenger, and to a rear right side portion of the torso strap 301. There is also a second shoulder strap 303 extending from a front central portion of the torso strap 301, over a right shoulder of the passenger, and to a rear left side portion of the torso strap 301.

At the rear of the harness, there is a back portion 304 that rests approximately between the shoulders of the passenger. The back portion comprises a layer of material provided with an upper slot 305 and a lower slot 306. The shoulder straps 302, 303 have been inserted through the back portion 304 at the upper slot 305. The straps 302, 303 have then been fed back through the lower slot 306. Hence, the straps 302, 303 lie in between the passenger 500 and the back portion 304, over the distance between the two slots 305, 306.

The harness 300 also comprises a central buckle 309 located at a front central portion on the torso strap 301. Hence, the central buckle 309 is used to attach two ends of the torso strap together to secure the torso strap 301 around the passenger 500. The central buckle also has insert region for front ends of the shoulder straps 302, 303. Hence, the central buckle 309 is used to secure the shoulder straps 302, 303 in place over the passenger's shoulders.

The central buckle 309 is provided with a spool mechanism (not shown) so that the straps 301, 302, 303 can be automatically retracted to a suitable length, to allow for different size passengers and providing a suitable tightness of harness 300 for each one. The central buckle may be provided with a quick release mechanism to release the connection of the different straps 301, 302, 303 in one action.

Figure 4:
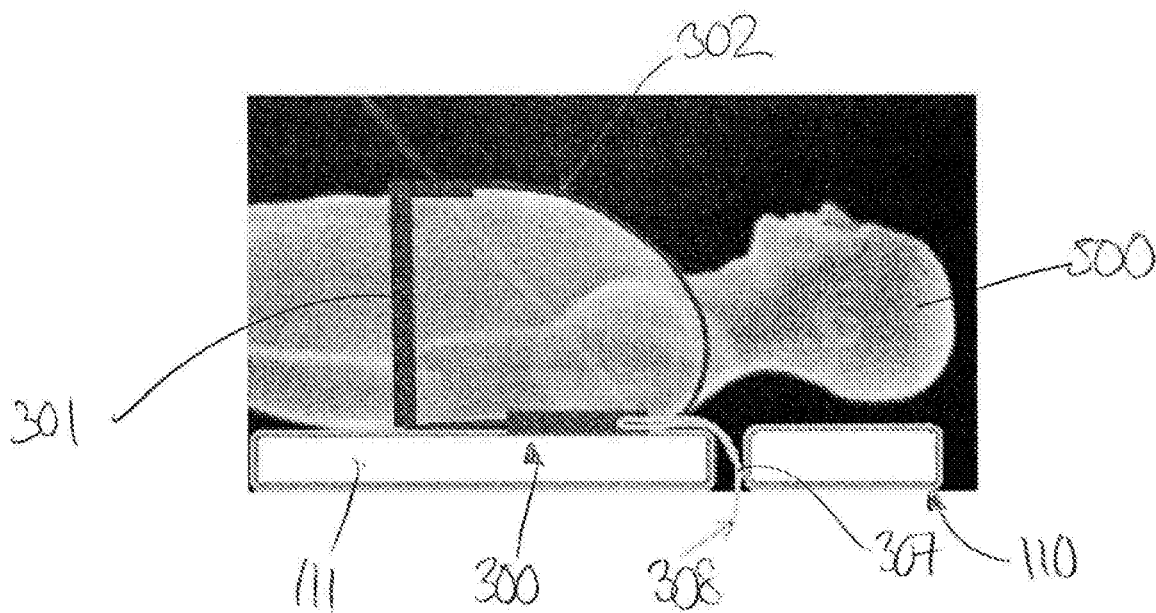
FIG. 4 shows a side view of the passenger of FIG. 3 wearing the harness, and being attached to a bed surface of an aircraft passenger seat.

There is also a tether 307 attached to a top of the back portion 304. This tether 307 has an attachment buckle 308 at a distal end from the back portion 304. This attachment buckle 308 attaches to a corresponding attachment point adjacent a bed surface 111 of an aircraft seat 110 similar to that described above in relation to FIG. 1. This is shown in FIG. 4. The attachment point is on the end of a spooled seat belt that is located in between the headrest and backrest of the seat.

Here, it can be seen that the passenger 500 wearing the harness 300 (including shoulder strap 302 and torso strap 301) is lying down on the bed surface 111 and is secured to it by the tether 307, attachment buckle 308 and corresponding attachment point of the aircraft seat.

Figure 5:
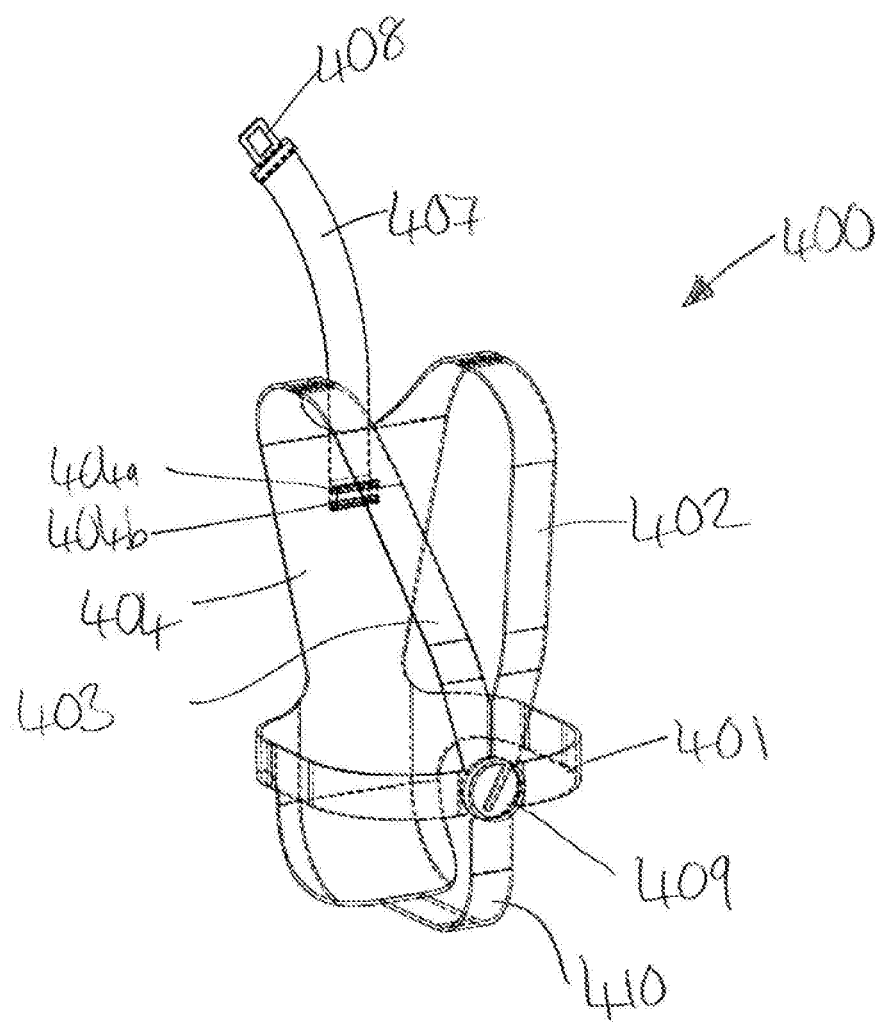
FIG. 5 shows a perspective view of a harness, according to a third embodiment of the invention.
Figure 6:
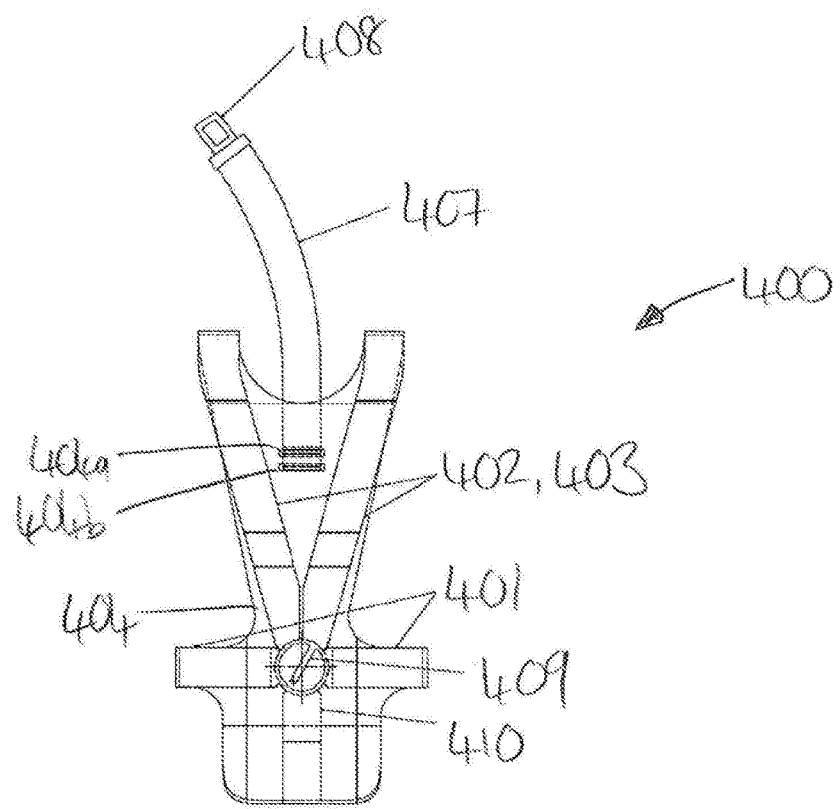
FIG. 6 shows a front view of the harness of FIG. 5.
Figure 7:
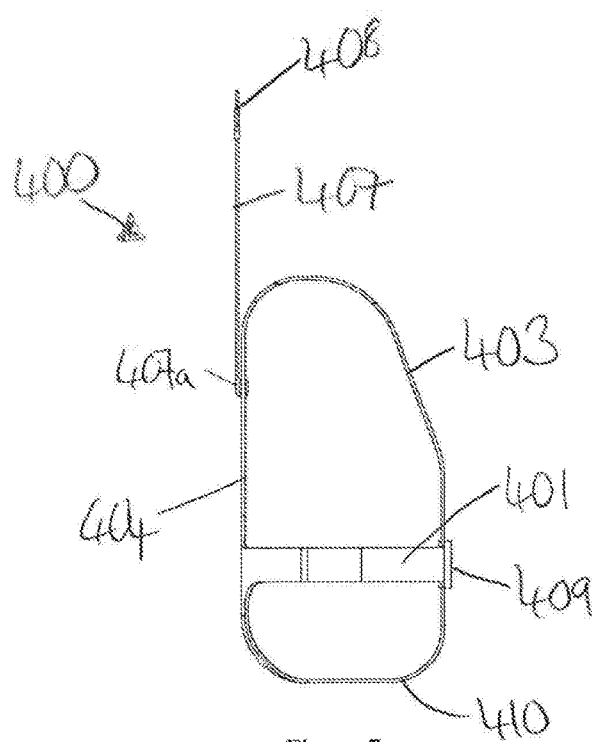
FIG. 7 shows a side view of the harness of FIGS. 5 and 6.

FIGS. 5, 6 and 7 show different views of a different harness 400, according to a third embodiment of the invention. The harness 400 is somewhat similar to the harness 300 and so only the differences will be described in detail.

The harness 400 comprises a body portion 404, which is designed to lie against the back of the passenger and extend from a neck region to a buttock region of the passenger.

The harness has a waist strap 401 for extending around the waist of the passenger 500. The waist strap 401 is formed by a strap portion at the front of the harness. The body portion 404 provides the extension around the waist around the back of the passenger.

The harness also comprises a first shoulder strap 402 for extending from a front central portion of the waist strap 401, over a left shoulder of the passenger, and to a left side of the top of the body portion 404 at the back of the harness. There is also a second shoulder strap 403 extending from a front central portion of the waist strap 401, over a right shoulder of the passenger, and to a right side of the top of the body portion 404.

There is also a crotch strap 410 that extends from a central bottom portion of the back portion 404 and is designed to extend through a passenger's legs to attach to the front central portion of the waist strap 401.

A central buckle 409, located at the front central portion on the waist strap 401, is used to attach two ends of the waist strap 401 together to secure around the passenger 500. The central buckle also has insert region for front ends of the shoulder straps 402, 403. The central buckle also has insert region for a front end of the crotch strap 410. Hence, the central buckle 409 is used to secure the shoulder straps 402, 403 in place over the passenger's shoulders, the waist strap 401 around the waist and the crotch strap 410 in between the legs.

The central buckle 409 is provided with a spool mechanism (not shown) so that the straps 401, 402, 403, 410 can be automatically retracted to a suitable length, to allow for different size passengers and providing a suitable tightness of harness 400 for each one. The central buckle may be provided with a quick release mechanism to release the connection of the different straps 401, 402, 403, 410 in one action.

There is also a tether 407 attached to a top of the body portion 404. The tether 407 is attached through a loop 407*a* in the tether 407 being looped through upper and lower slots 404*a*, 404*b* towards the top of the body portion 404.

The tether 407 has an attachment buckle 408 at a distal end from the body portion 404. This attachment buckle 408 attaches to a corresponding attachment point adjacent a bed surface 111 of an aircraft seat 110 similar to that described above in relation to FIG. 1. The attachment point is on the end of a spooled seat belt that is located in between the headrest and backrest of the seat.

FIGS. 8, 9 and 10 show different views of a different harness 600, according to a fourth embodiment of the invention. The harness 600 is somewhat similar to the harness 300 and harness 400 and so only the differences will be described in detail.

The harness 600 comprises a waist strap 301 for extending around the waist of the passenger 500. The harness also comprises a first shoulder strap 602 extending from a front central portion of the waist strap 601, over a left shoulder of the passenger. There is also a second shoulder strap 603 extending from a front central portion of the waist strap 601, over a right shoulder of the passenger.

The two shoulder straps 602, 603 are joined together above a back portion 604 of the harness, which is designed to rest approximately in the middle of the back of the passenger.

The back portion 604 comprises a layer of material provided with an upper slot 605 and a lower slot 606. The joined together shoulder straps have been inserted through the back portion 604 at the upper slot 605. The joined together strap has then been fed back through the lower slot 606. Hence, the body portion 604 is designed to lie in between the passenger and the strap, over the distance between the two slots 605, 606.

Below the back portion 604, the strap is split back into the two individual shoulder straps and attached to the rear of the waist strap 601. As can be seen the shoulder straps form a cross (X) shape at the rear of the harness 600. The back portion 604 is provided at the "crossover" of the straps.

The harness 600 also comprises a central buckle 609 located at a front central portion on the waist strap 601. Hence, the central buckle 609 is used to attach two ends of the waist strap together to secure the waist strap 601 around a passenger. The central buckle also has insert region for front ends of the shoulder straps 602, 603. Hence, the central buckle 609 is used to secure the shoulder straps 602, 603 in place over the passenger's shoulders.

The central buckle 609 is provided with a spool mechanism (not shown) so that the straps 601, 602, 603 can be automatically retracted to a suitable length, to allow for different size passengers and providing a suitable tightness of harness 600 for each one. The central buckle may be provided with a quick release mechanism to release the connection of the different straps 601, 602, 603 in one action.

There is also a tether 607 attached to a top of the back portion 604. The tether 607 is attached through a loop 607a in the tether 607 being looped through upper and lower tether slots 604a, 604b towards the top of the back portion 604.

This tether 607 has an attachment buckle 608 at a distal end from the back portion 604. This attachment buckle 608 attaches to a corresponding attachment point adjacent a bed surface 111 of an aircraft seat 110 similar to that described above in relation to FIG. 1. The attachment point is on the end of a spooled seat belt that is located in between the headrest and backrest of the seat.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The bed surface 111 may be inclined or angled to the horizontal. The bed surface 111 may not be flat.

The seat unit 100 may be positioned so that the seat 110 is angled to the flight direction 101.

The seat belt 112 may not be provided with a spool mechanism. The seat belt 112 may be a three-point belt or a harness.

There may be any suitable number and location of attachment straps 211, 212. The cover 200 may alternatively be held in place by any other suitable attachment provided.

Any suitable closure 204 may be used. The closure 204 may be located in a region bigger or small or in a different place than shown in FIG. 1.

The bladder 221 may be located along only part of the length of the upper layer 201. For example, the bladder 221 may be located in only a selected number of the following regions of the bed surface 111: foot region, lower leg region, knee region, upper leg region, waist region, torso region, and shoulder region. However, the bladder 221 would generally be expected to be located in the knee region to enable the passenger's legs to be effectively "pinned down" to the bed surface 111 to prevent leg injury, and prevent the passenger sliding on the bed surface 111. For example, the bladder 221 may be located in the knee region and upper leg region of the bed surface 111.

There may be more than one inflatable bladder 221 providing protection for the passenger. For example, a first inflatable bladder may be located in the knee region 114 and a second inflatable bladder located in the upper leg region. The same trigger mechanism 209 may be used to trigger inflation of the more than one inflatable bladder. Or, there may be more than one trigger mechanism to trigger inflation of the different inflatable bladders. For example, there may be one trigger mechanism per inflatable bladder. There may be more than one inflatable bladder 221 providing protection for the passenger in the knee region.

The head protector bladder may be the same bladder (i.e. an extended part of the bladder) 221.

If the head protector bladder is a different bladder to the bladder 221, it may be triggered by a different trigger mechanism to that which triggers inflation of bladder 221.

The cover may be provided with a removable liner. This allows for the liner to be easily removed for washing (and reduce the amount of washing required for the part of the cover comprising the inflatable bladder). The liner could be attached to the cover by Velcro™ or a zip, for example.

The torso strap 301 may designed to be located around a waist part of the torso of the passenger 500.

Any suitable number and type of harness straps 301, 302, 303, 401, 402, 403, 410, 601, 602, 603 may be used.

The crotch strap 410 may be used with or without other straps, such as shoulder straps.

Any suitable attachment means, instead of buckles 309, 409, 308, 408, 608, 609 may be used. The attachment means may be quick release or not.

The straps may be provided as "pull straps" that can be pulled through a length adjuster to adjust the overall length of the strap. This arrangement may be used instead of the spool mechanism(s), especially in the case where the central buckle 309, 409, 609 is too small to accommodate a spool mechanism.

The cover and the harness(es) may be used together or separately.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. A cover attachable to an aircraft passenger seat, the cover comprising:

an upper layer comprising an inflatable bladder, wherein the upper layer spreads at least partially across a bed surface of the seat, and the inflatable bladder is configured so as to extend across at least 50% of the width of a knee region of the bed surface of the seat;

a lower layer connected to the upper layer, the lower layer spreading across a top of the bed surface;

a space between the upper layer and the lower layer configured to receive a passenger;

an attachment mechanism for attaching the lower layer to the bed surface; and a trigger mechanism for triggering inflation of the inflatable bladder, wherein the cover is arranged to cover a passenger in close proximity to the passenger when lying on the bed surface, and wherein when the inflatable bladder is inflated, the cover is configured to provide pinning down force such that sliding of the passenger in a forward, a backward and a sideways directions is restricted.

2. The cover as claimed in claim 1, wherein the lower layer is held in place by attachment straps to the bed surface.

3. The cover as claimed in claim 2, wherein the inflatable bladder is provided in a region approximately 40 to 50 cm from a seatbelt loop or sleeve.

4. The cover as claimed in claim 3, wherein the inflatable bladder is provided in a region around 45 cm from the seatbelt loop or sleeve.

5. The cover as claimed in claim 1, wherein the lower layer is provided with the attachment mechanism.

6. The cover as claimed in claim 1, wherein the cover is in the form of a bag provided by the upper and lower layers and an at least partially closed end.

7. The cover as claimed in claim 1, wherein the upper and lower layers are provided with a closure along at least one length edge, to allow the upper and lower layers to be closed together along that length edge.

8. The cover as claimed in claim 7, wherein in a region along the length edge, the upper and lower layers are not provided with a closure.

9. The cover as claimed in claim 8, wherein the region along the length edge is towards one end of the length edge.

10. The cover as claimed in claim 9, wherein the region along the length edge is below the knee region of the bed surface.

11. The cover as claimed in claim 7, wherein the closure can be opened by relative movement of the upper layer away from the lower layer.

12. The cover as claimed in claim 1, wherein the inflatable bladder is provided with a slow release valve to enable deflation.

13. The cover as claimed in claim 1, wherein the cover comprises a head protector configured so as to at least partially surround a head region of the bed surface, the head protector comprising an inflatable bladder.

14. An aircraft passenger seat unit comprising a seat convertible to a bed, the seat unit being provided with a cover according to claim 1.

15. The cover as claimed in claim 1, wherein the cover extends across at least 75% of the width of the knee region.

16. The cover as claimed in claim 15, wherein the cover extends across 100% of the width of the knee region.

17. The cover as claimed in claim 1, wherein the inflatable bladder is coupled located along the upper leg and knee region of the cover.

18. A cover for an aircraft passenger using a bed surface of an aircraft passenger seat, the cover comprising:

an upper layer comprising an inflatable bladder, wherein the inflatable bladder is configured to extend across at least 50% of the width of a knee region of the bed surface;

a lower layer connected to the upper layer along one side, and the upper layer is connected to, or connectable to via a closure, the lower layer along an opposite side, the lower layer spreading across the top of the bed surface;

a space between the upper layer and the lower layer configured to receive a passenger;

an attachment mechanism for attaching the lower layer to the bed surface; and a trigger mechanism for triggering inflation of the inflatable bladder, wherein the cover is arranged to cover a passenger in close proximity to the passenger when lying on the bed surface, and wherein when the inflatable bladder is inflated, the cover is configured to provide pinning down of the passenger such that sliding of the passenger along the bed surface in a forward, a backward and sideways directions is restricted.

* * * * *